(12) United States Patent
Nakayama (10) Patent No.: US 7,355,738 B2
(45) Date of Patent: Apr. 8, 2008

(54) IMAGE FORMING APPARATUS AND METHOD OF CONTROLLING THE APPARATUS

(75) Inventor: Fumiharu Nakayama, Yokohama (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 98 days.

(21) Appl. No.: 11/449,785

(22) Filed: Jun. 9, 2006

(65) Prior Publication Data

US 2006/0227345 A1     Oct. 12, 2006

Related U.S. Application Data

(63) Continuation of application No. 09/955,307, filed on Sep. 19, 2001, now abandoned.

(51) Int. Cl.
*G06F 3/12* (2006.01)
(52) U.S. Cl. .................... 358/1.15; 358/1.13; 358/402; 358/403; 358/468
(58) Field of Classification Search ............... 358/1.15, 358/1.12, 1.13, 1.9, 1.16, 402, 403, 468, 358/483, 487; 355/40, 46; 399/43, 46
See application file for complete search history.

(56) References Cited

U.S. PATENT DOCUMENTS

| | | | | |
|---|---|---|---|---|
| 6,141,111 | A | * | 10/2000 | Kato .......................... 358/1.15 |
| 2001/0054793 | A1 | * | 12/2001 | Nakahira et al. ........... 271/298 |

FOREIGN PATENT DOCUMENTS

| | | |
|---|---|---|
| JP | 9-179711 A | 7/1997 |
| JP | 2001-16539 A | 1/2001 |

* cited by examiner

*Primary Examiner*—Twyler Lamb
*Assistant Examiner*—Vu Hang
(74) *Attorney, Agent, or Firm*—Foley & Lardner LLP (57) ABSTRACT

When a user registers a type and a condition of image formation by a terminal, the terminal determines a reservation number specific to contents of the registration, and the determined reservation number is displayed on the display of the terminal. The user watches this display and can know the reservation number. Once the reservation number is determined, registration data containing the determined reservation number and the content of the registration is generated by the terminal. The registration data is sent to the body of the apparatus. The registration data sent to the body is stored in the body. When the user stands in front of the body and inputs the reservation number, respective registration data are searched for corresponding to the reservation number. Further, based on the searched registration data, image reading, image processing, and image printing are controlled.

17 Claims, 8 Drawing Sheets

FIG. 13 ial No. 09/955,307, filed Sep. 19, 2001, now abandoned the entire contents of which is incorporated herein by reference.

BACKGROUND OF THE INVENTION

An image forming apparatus which optically reads an image of an original document set on an original document table, processes the read image, and prints it on paper, is known.

This image forming apparatus comprises a control panel. This control panel is provided with a touch-panel-type liquid crystal display section, a ten-key section, a copy key, and the like. A user stands in front of the body of the apparatus and touches the touch-panel-type liquid crystal display section by fingertip. Thus, the type of image formation (copy mode) and the conditions of image formation (the size and direction of the original document, size and direction of paper, number of copies, and the like) can be set in a desired state.

However, if the number of types of image formation increases much or if the conditions of image formation are complicated, proper setting cannot be achieved in some cases. For example, a setting error may occur or a long time may be taken for setting.

If a setting error occurs, paper may be wasted. If a long time is taken for setting, other persons cannot use the apparatus readily.

BRIEF SUMMARY OF THE INVENTION

The object of the present invention is to provide an image forming apparatus capable of properly and rapidly setting the type and conditions of image formation even when there are a large number of types of image formation or if the conditions of image formation are complicated.

An image forming apparatus according to the present invention comprises:

an original document table for setting an original document;

a read section which reads an image of the original document set on the original document table;

an image processing section which processes an image read by the read section;

a print section which prints an image to be processed by the image processing section, onto paper;

a terminal for previously registering a type and a condition of image formation, provided separately from a body of the apparatus; and a controller which controls the read section, the image processing section, and the print section, in accordance with a content of registration made by the terminal.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

In the following, an embodiment of the present invention will be explained with reference to the drawings.

Figure 1:
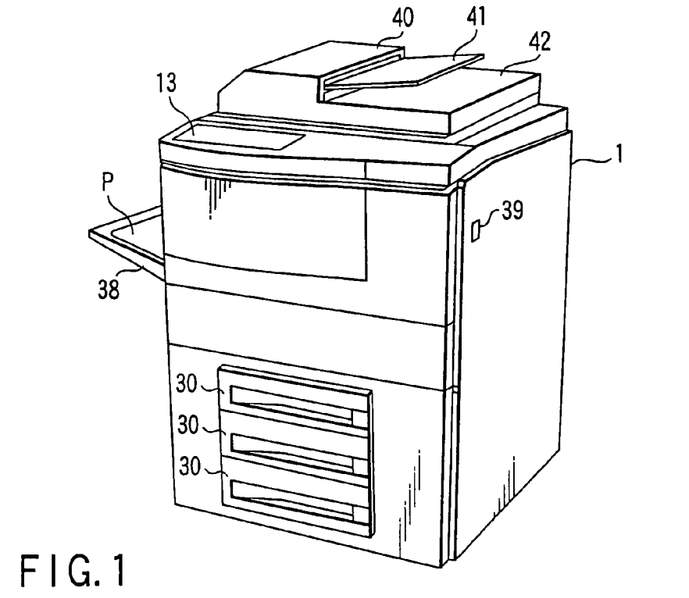
FIG. 1 is a view showing the outer appearance of an embodiment of the present invention.
Figure 2:
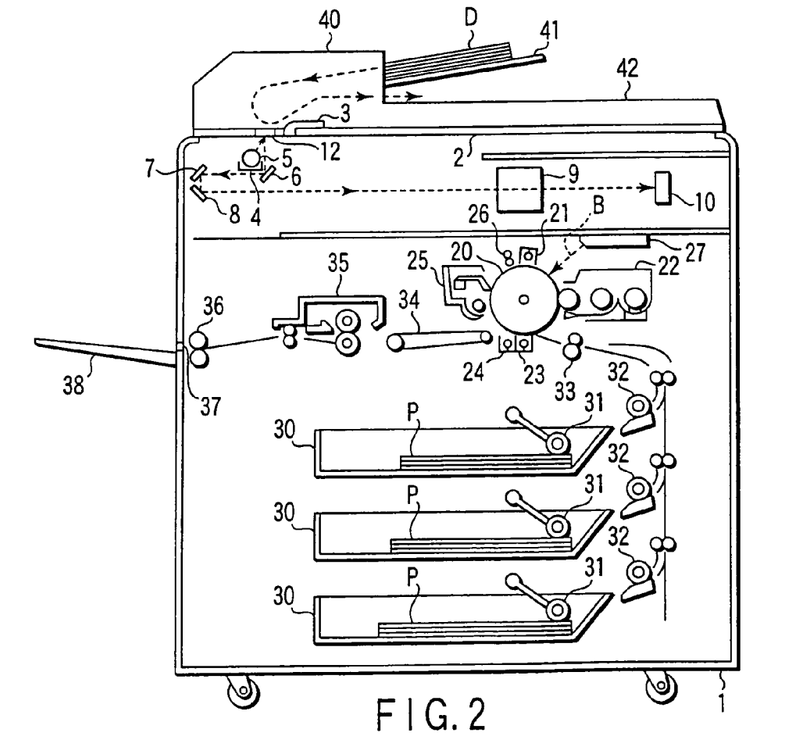
FIG. 2 is a view showing the internal structure of the embodiment.

As shown in FIGS. 1 and 2, a transparent document table (glass plate) 2 for setting an original document is provided at the upper surface part of the body 1. An indicator 3 is provided at an end part of the document table 2. A gap part between the indicator 3 and the document table 2 is a reference position for setting of an original document.

In the side of the lower surface of the document table 2, there are provided a plurality of original document sensors 11 described later. These document sensors 11 optically detect the presence or absence and size of an original document D set on the document table 2.

A carriage 4 is provided at the side of the lower surface of the document table 2, and an exposure lamp 5 is provided on the carriage 4. An exposure means is constructed by this carriage 4 and the exposure lamp 5. The carriage 4 is capable of moving (reciprocating) along the lower surface of the original document table 2. The carriage 4 moves and the exposure lamp 5 turns on, thereby exposing the original document D set on the original document table 2.

By this exposure, a reflection light image from the original document D is obtained and is projected onto a CCD (Charge Coupled Device) 10 by reflection mirrors 6, 7, and 8 and a magnification change lens block 9. The CCD 10 has a large number of photoelectric conversion elements in light receiving regions, and these light receiving regions are subjected to line-scanning thereby to output an image signal corresponding to the image of the original document D.

The image signal outputted from the CCD 10 is amplified and converted into a digital signal. The digital signal is processed by the image processing section 74 described later and is thereafter supplied to a laser unit 27. The laser unit 27 generates a laser beam B corresponding to the input signal.

A window 12 for reading an original document is provided at a position adjacent to the indicator 3 of the document table 2. The window 12 has a size and shape corresponding to the length of the indicator 3 in its lengthwise direction.

An automatic document feeder (ADF) 40 is provided to be openable and closable above the original document table 2, indicator 3, and window 12. The automatic document feeder 40 has a tray 41 for setting an original document, and a plurality of sheets of an original document D are fed one after another to the window 12 and passed over the window 12, and the original document D which has passed there over is discharged to a tray 42. When this automatic document feeder 40 operates, the exposure lamp 5 emits light at a position corresponding to the window 12, and the light is irradiated on the window 12. The light irradiated on the window 12 exposes the original document D passing over the window 12, through the window 12.

By this exposure, a reflection light image from the original document D is obtained and is projected onto the CCD 10 by the reflection mirrors 6, 7, and 8 and the magnification change lens block 9.

Figure 3:
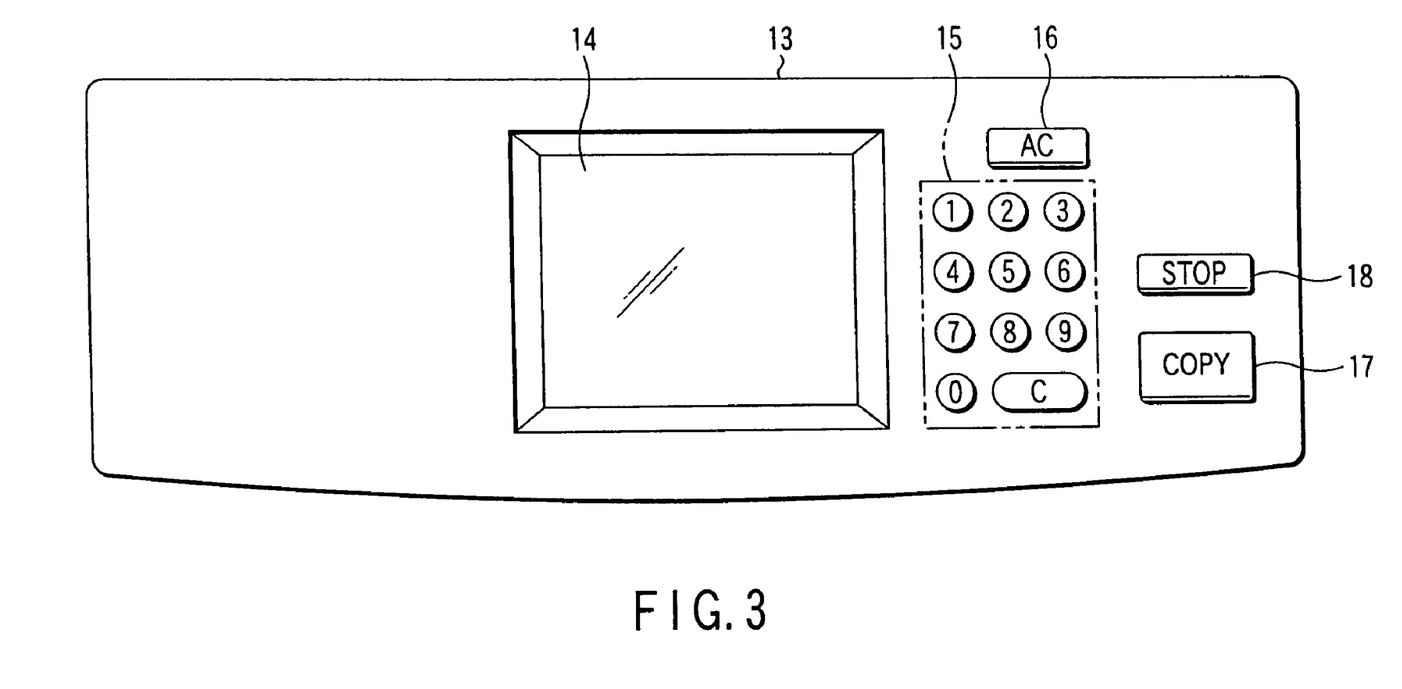
FIG. 3 is a view showing the structure of a control panel of the embodiment.

At the upper surface part of the body 1, a control panel 13 is provided at a position where the automatic document feeder 40 does not hang over. The control panel 13 comprises a touch-panel type liquid crystal display section 14, a ten-key section 15 for numerical input, an all-clear key 16, a copy key 17, and a stop key 18. The touch-panel type liquid crystal display section 14 allows finger-input of information, and can display various information including information thus inputted. As a user touches the touch-panel type liquid crystal display section 14, the type (copy mode) of image formation and the conditions (size and direction of an original document, size and direction of paper, the number of sheets of copies) of image formation can be set in desired states.

Meanwhile, the photosensitive drum 20 is provided to be rotatable at the substantial center part in the body 1. Around this photosensitive drum 20, a charger 21, a developing device 22, a transfer device 23, a peeling device 24, a cleaner 25, and a discharger 26 are provided sequentially. Further, a laser beam B emitted from the laser unit 27 is irradiated on the surface of the photosensitive drum 20, between the charger 21 and the developer 22.

At the bottom part of the body 1, there are provided a plurality of paper supply cassettes 30. These paper supply cassettes 30 respectively contain different sizes of paper P. When either the copy key 17 or a convenient key 19 is pressed, sheets of paper P are picked out one after another from any one of the paper supply cassettes 30. The cassettes 30 are respectively provided with pick-up rollers 31. Each of the sheets of paper P thus picked out is separated from the cassette 30 by a separator 32 and is supplied to a resist roller 33. The resist roller 33 feeds each sheet of paper P between the photosensitive drum 20 and the transfer device 23 at a timing in consideration of rotation of the photosensitive drum 20.

The charger 21 applies a high voltage to the photosensitive drum 20, thereby charging it with an electrostatic charge. The laser beam B emitted from the laser unit 27 is irradiated onto the surface of the photosensitive drum 20 after completion of this charging. The laser unit 27 performs main-scanning (line scanning) on the surface of the photosensitive drum 20. By sub-scanning in which the main scanning is repeated in accordance with rotation of the photosensitive drum 20, an electrostatic latent image corresponding to a read image from the original document D is formed on the surface of the photosensitive drum 20.

The electrostatic latent image on the photosensitive drum 20 receives a developing agent (toner) from the developing device 22 and is thereby developed. This developed image is transferred to a sheet of paper P by the transfer device 23. The paper sheet P to which the developed image has been transferred is peeled off from the photosensitive drum 20 by the peeling device 24. The developing agent and electric charge remain on the surface of the photosensitive drum 20 from which the paper sheet P has been peeled off. The remaining developing agent is removed by the cleaner 25 and the remaining electric charge is removed by the discharger 28.

The paper sheet P peeled off from the photosensitive drum 20 is sent to a fixing device 35. The fixing device fixes the transferred image to the paper sheet P by heat. The paper P after the fixing is sent to a discharge port 37 by a discharge roller 36 and is discharged from the discharge port 37 to a tray 38 outside the body 1.

On another side of the body 1, a power source switch 39 is provided.

Figure 4:
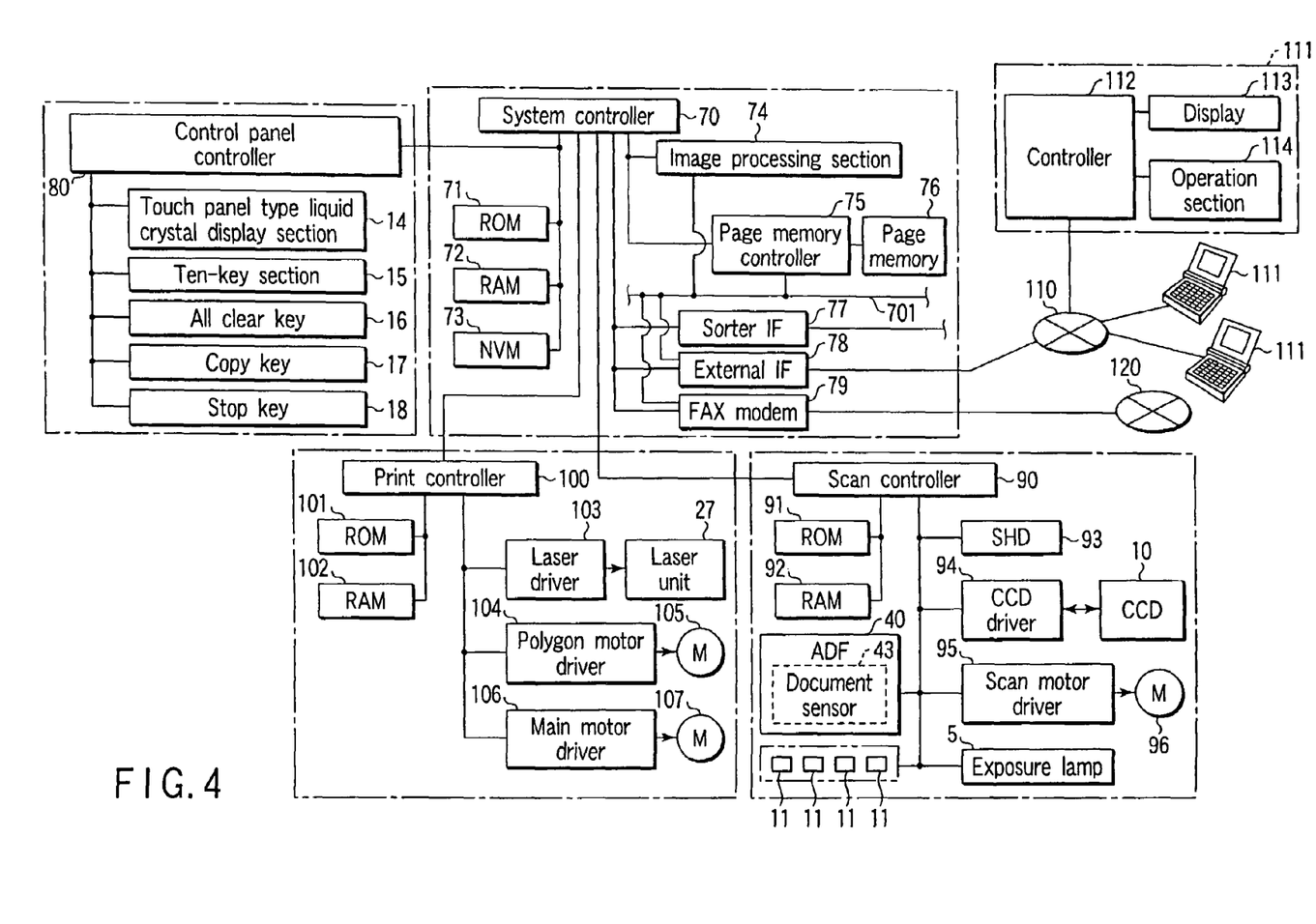
FIG. 4 is a block diagram of a control circuit of the embodiment.

The total control circuit of the apparatus is shown in FIG. 4.

A system controller 70 is connected with a control panel controller 80, a scan controller 90, and a print controller 100. The system controller 70 unitarily controls the control panel controller 80, scan controller 90, and print controller 100.

Also, the system controller 70 is connected with a ROM 71 for storing a control program, a RAM 72 for storing data, an NVM 73, an image processing section 74, a page memory controller 75, a sorter interface 77, an external internal 78, and a FAX modem 79. The page memory controller 75 is connected with a page memory 76. Further, the image processing section 74, page memory controller 75, external interface 78, and FAX modem 79 are mutually connected with each other by an image data bus 701.

The external interface 78 is connected with a plurality of terminals provided separately from the body 1, through a network such as a LAN 110. Each terminal 111 is, for example, a personal computer which is constructed by a controller 112, a display 113, and an operation section 114. The controller 112 includes: a means for sequentially displaying an initial screen, a selection screen, a setting screen, a confirmation screen, and a guide screen for allowing a user to register the type and conditions of image formation, in accordance with an operation on the operation section 114; a means for determining a reservation number specific to a content of registration in a case where the type and conditions of image formation are registered by the operation on the operation section 114 accompanied by display of those screens; a means for informing a user of the determined reservation number by the display 113; a means for generating registration data comprised of the determined reservation number and the registration content; and a means for transmitting the generated registration data to the body 1.

The FAX modem 79 is connected with a telephone line 120.

The control panel controller 80 is connected with the touch-panel type liquid crystal display section 14, ten-key section 15, all-clear key 16, copy key 17, and stop key 18.

The scan controller 90 is connected with the ROM 91 for storing a control program, the RAM 92 for storing data, the shading correction section (SHD) 93, a CCD driver 94, a scan motor driver 95, the exposure lamp 5, the automatic document feeder 40, and the respective original document sensors 11. The CCD driver 94 drives the CCD 10. The scan motor driver 95 drives a scan motor 96 for driving the carriage. The automatic document feeder 40 has a document sensor 43 for detecting an original document D set on the tray 41 and its size.

The print controller 100 is connected with a ROM 101 for storing a control program, a RAM 102 for storing data, a laser driver 103, a polygon motor driver 104, a main motor driver 106, and a sorter 44. The laser driver 103 drives the laser unit 27. The polygon motor driver 104 drives the motor of a polygon mirror for scanning the photosensitive drum 20 with the laser beam B. The main motor driver 106 drives a main motor 107 as a drive source for the photosensitive drum 20 and a paper conveyor mechanism.

A read section for optically reading an image of an original document D is constructed mainly by the scan controller 90. A print section for printing an image read by the read section onto a paper P is constructed mainly by the print controller 100.

The system controller 70 includes: a means for storing respective registration data items sent from the terminals 111 into the RAM 72; a means for searching the registration data in the RAM 72 for registration data corresponding to a reservation number in case where a registration number as described above is inputted through the touch-panel type liquid crystal display section 14; and a means for controlling the read section, image processing section 74, and print section, based on the searched registration data.

Next, the operation will be explained with reference to FIGS. 5 to 13.

Figure 5:
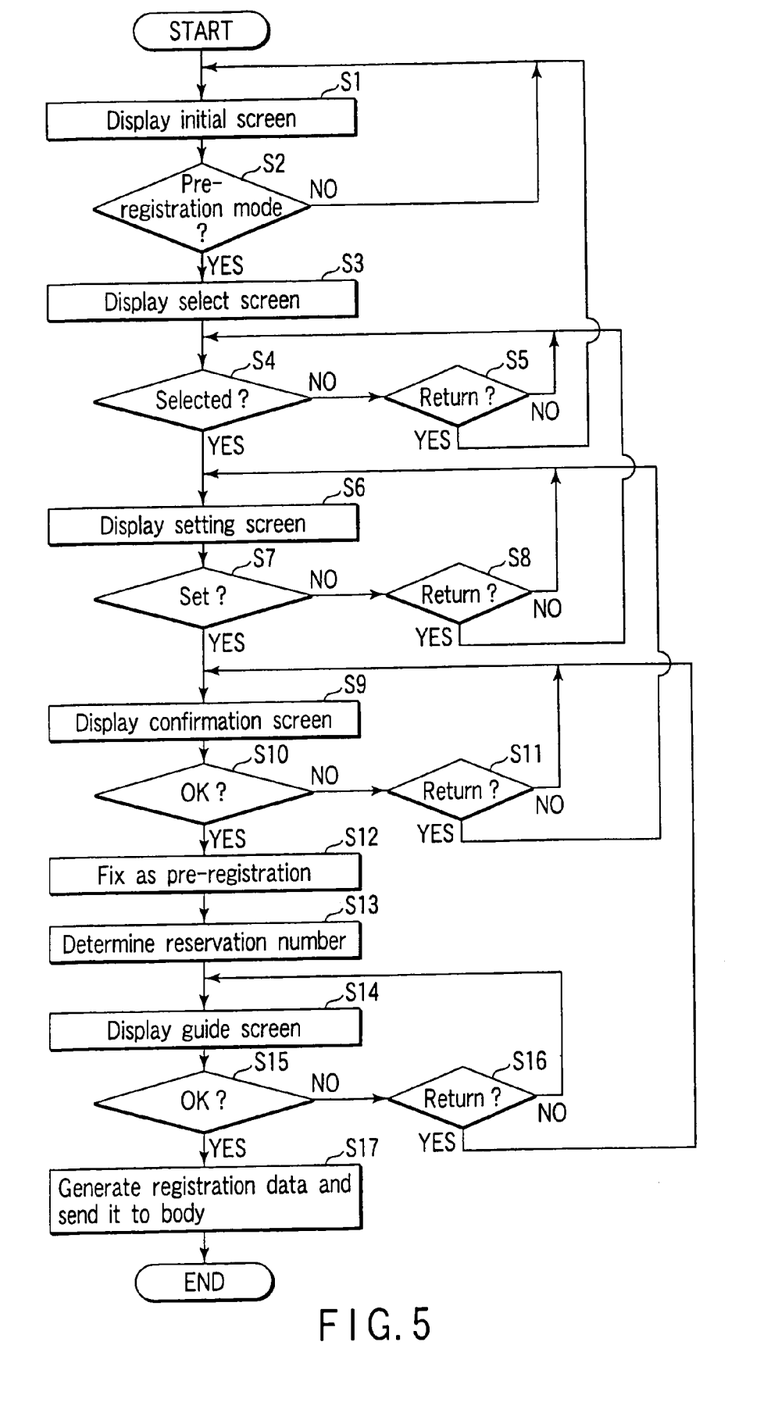
FIG. 5 is a flowchart for explaining control of the terminal of the embodiment.
Figure 10:
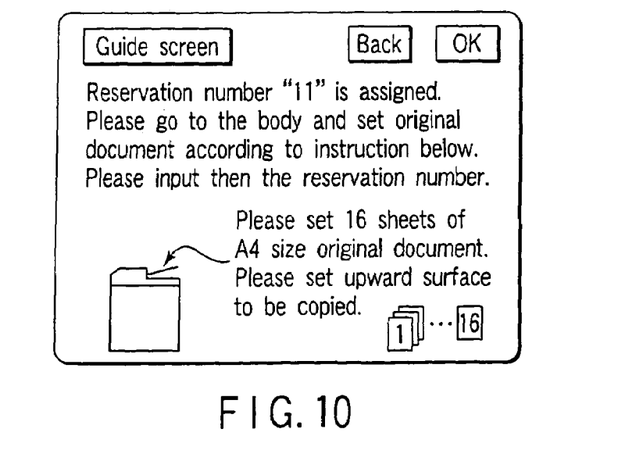
FIG. 10 is a view showing a guide screen displayed on the terminal of the embodiment.
Figure 11:
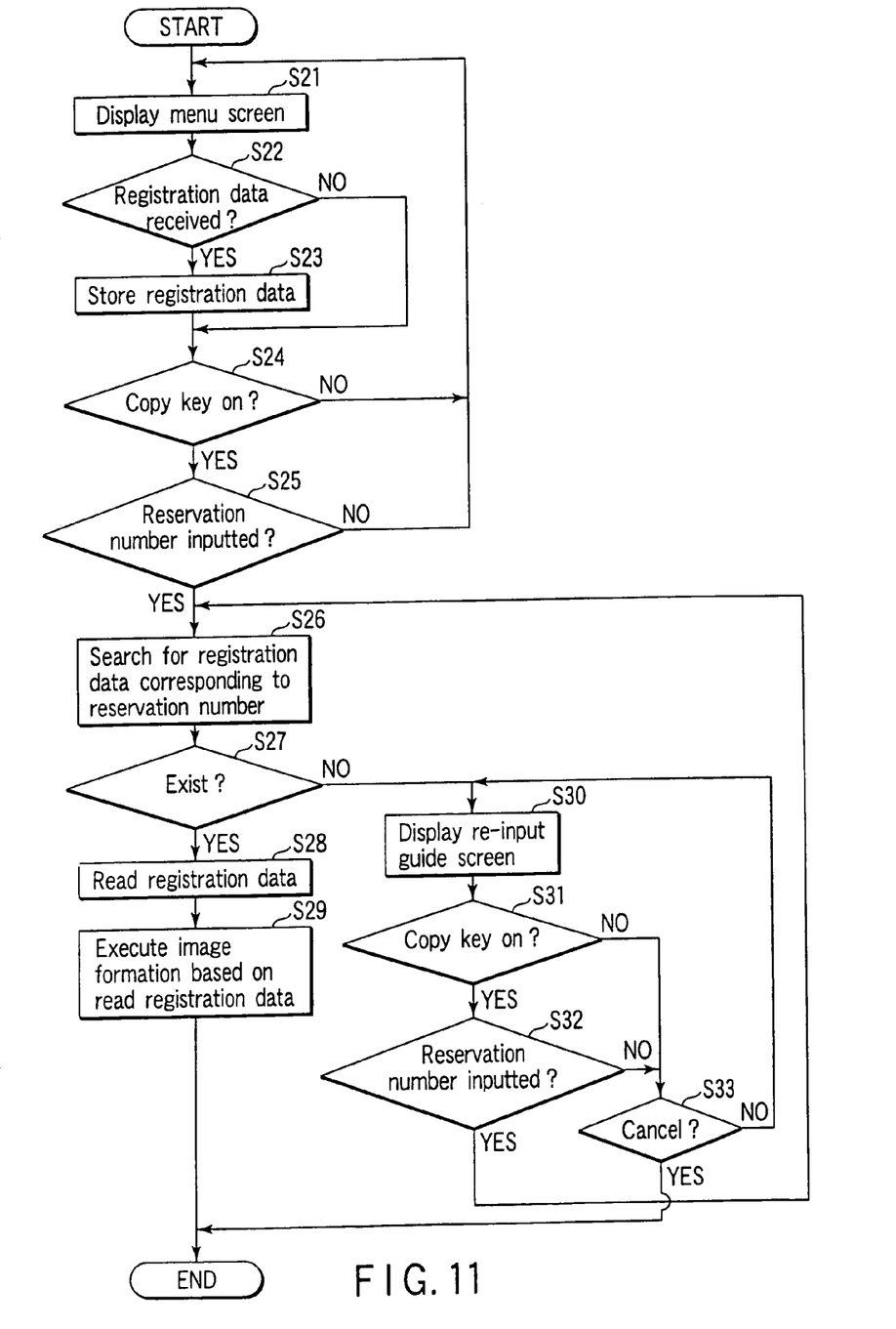
FIG. 11 is a flowchart for explaining control of the body of the embodiment.
Figure 12:
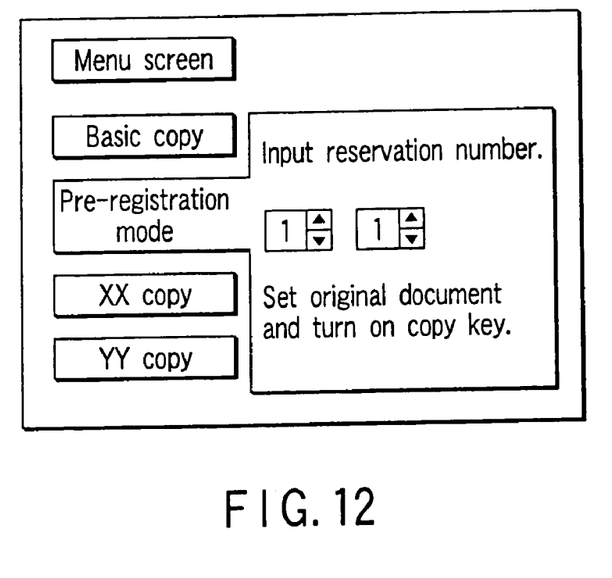
FIG. 12 is a view showing a menu screen displayed on a touch-panel type liquid crystal display section of the embodiment.
Figure 13:
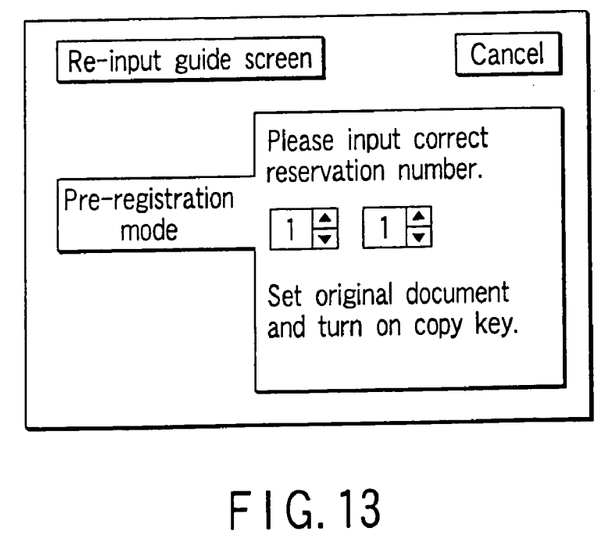
FIG. 13 is a view showing a re-input guide screen displayed on the touch-panel type liquid crystal display section of the embodiment.

FIG. 5 shows control of the terminal 111. FIGS. 6, 7, 8, 9, and 10 show screens displayed on the display 112 on each terminal 112. FIG. 11 shows control of the system controller 70. FIGS. 12 and 13 shows screens displayed on the touch-panel type liquid crystal display section 14.

Figure 6:
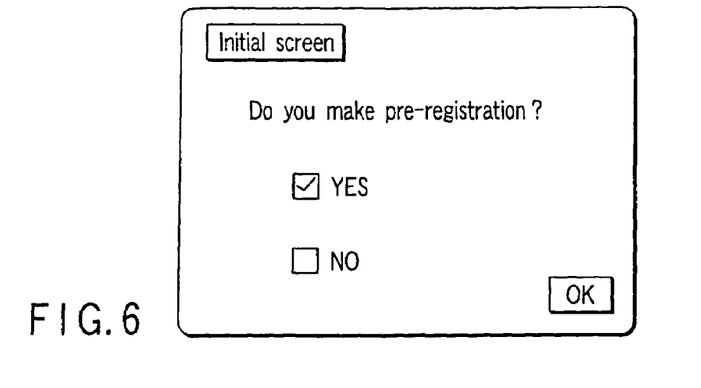
FIG. 6 is a view showing an initial screen displayed on a terminal of the embodiment.

The initial screen shown in FIG. 6 is displayed on the display 113 of each terminal 111 (step S1). The initial screen allows a user to specify the presence or absence of pre-registration, and includes a specification window of "YES", a specification window of "NO", and a key "OK". If the specification window of "YES" is checked with a check mark by operation on the operation section 114 and if the key "OK" is then clicked, a pre-registration mode (presence of pre-registration) is specified.

Figure 7:
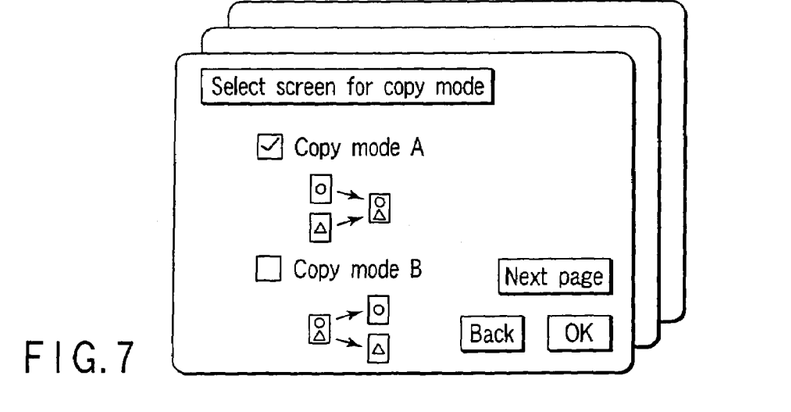
FIG. 7 is a view showing a select screen displayed on the terminal of the embodiment.

If the pre-registration mode is specified (YES in step S2), the screen switches to the select screen for copy modes (step S3), shown in FIG. 7. The select screen for copy modes allows a user to select the type of image formation (copy modes A, B, . . . ) as a target of the pre-registration, and includes a specification window of "copy mode A", a specification window of "copy mode B", a key "back", and a key "next page".

The copy mode A achieves image formation in which, for example, images of a plurality of original documents, e.g., four images are each minified. These minified plural images are connected with each other and printed onto one sheet of paper P. The copy mode B achieves image formation in which, for example, an image of one original document is divided into a plurality of portions, and these portions are respectively printed onto a plurality of paper sheets P. Actually, not only the two types of copy modes A and B but also more types of copy modes are prepared. Since all of these copy modes are taken as selection targets, a plurality of select screens are prepared. These select screens can be switched and displayed by clicking the key "next page".

In the case of selecting the copy mode A by operation on the operation section 114, a check mark is written in the specification window of "copy mode A", and the key "OK" is clicked next. In the case of selecting the copy mode B, a check mark is written in the specification window of "copy mode B" by operation on the operation section 114, and the key "OK" is clicked next. If a copy mode other than the copy modes A and B should be selected, the key "next page" is clicked to switch the select screen, and a similar operation is carried out on the select screen which introduces a desired copy mode.

If the key "back" is clicked without clicking the key "OK" (NO in step S4 and YES in step S5), the display of the display 113 returns to the initial screen shown in FIG. 6 (step S1).

Figure 8:
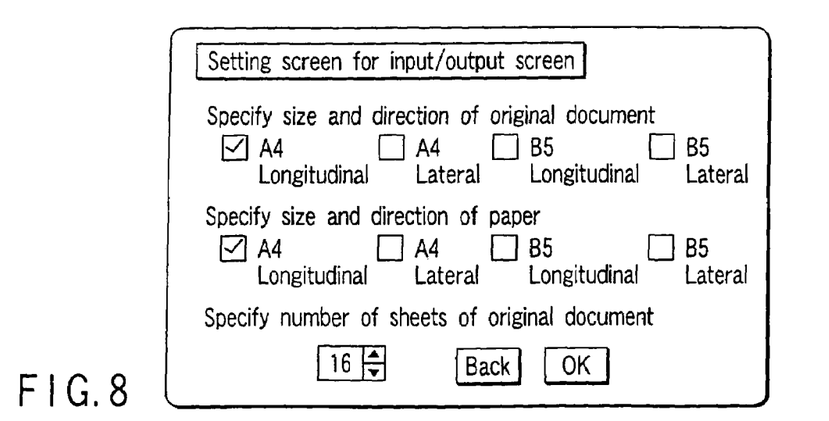
FIG. 8 is a view showing a setting screen displayed on the terminal of the embodiment.

When the key "OK" is clicked (YES in step S4), the display of the display 113 switches to the setting screen for input/output conditions which is shown in FIG. 8 (step S6), upon determination that selection is completed (YES in step S4).

The setting screen for input/output conditions allows a user to set the conditions necessary for the copy mode selected on the basis of the display of the select screen, and includes a plurality of windows for specifying the size and direction of an original document, a plurality of windows for specifying the size and direction of a paper sheet P, a number of windows for specifying the number of sheets of an original document, a key "back", and a key "OK".

In the copy mode A in which the images of four sheets of an original document are each minified and these minified plural images are combined to be printed onto a paper sheet P, all images of an original document can be printed onto four sheets of paper when the original document consists of 16 sheets. In this case, a check mark is written into the specification window of "A4*longitudinal" as a specification of the size and direction of the original document, and a numerical value "16" is written in the number specification window. Next, the key "OK" is clicked.

If the key "back" is clicked without clicking the key "OK" (NO in step S7 and YES in step S8), display on the display 113 returns to the select screen for the copy mode, which is shown in FIG. 7 (step S3). On this select screen for the copy mode, the type of image formation can be re-selected.

Figure 9:
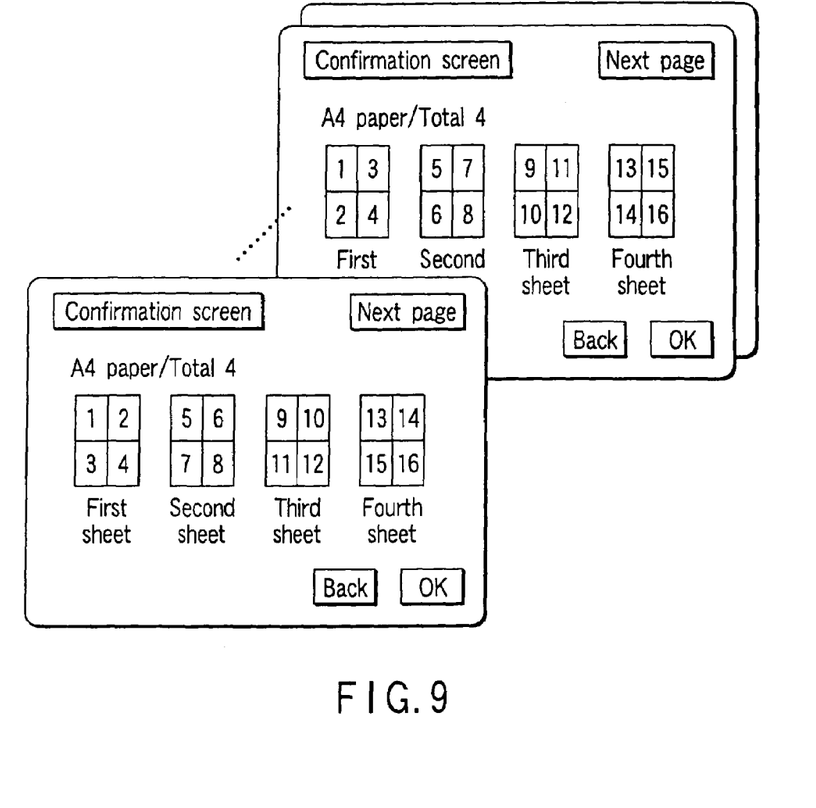
FIG. 9 is a view showing a confirmation screen displayed on the terminal of the embodiment.

When the key "OK" is clicked (YES in step S7), the display on the display 113 is switched to the confirmation screen shown in FIG. 9 (step S9) under a determination that setting has been completed (YES in step S7).

The confirmation screen allows a user to confirm the type of image formation selected on the basis of display of the select screen for the copy mode, and the conditions of image formation set on the basis of the setting screen for the input/output conditions. That is, it shows each of the states, i.e., images equivalent to four sheets of first to fourth pages of the original document are printed on a first paper sheet P, images equivalent to four sheets of fifth to eighth pages of the original document are printed on a second paper sheet P, images equivalent to four sheets of ninth to twelfth pages of the original document are printed on a third paper sheet P, and images equivalent to four sheets of thirteenth to sixteenth pages of the original document are printed on a fourth paper sheet P. Also, the confirmation screen includes a key "back", a key "OK", and a key "next page".

A plurality of pages are prepared for the confirmation screen. Any of these pages of the confirmation screen is selected by clicking the key "next page", and thus, the images of four sheets of the original document can be rearranged and printed.

When the key "back" on the confirmation screen is clicked (NO in step S10 and YES in step S11), the display of the display 113 returns to the setting screen for input/output conditions, which is shown in FIG. 8 (step S6). On this setting screen for input/output conditions, conditions of image formation can be reset.

When the key "OK" is clicked on the confirmation screen (YES in step S10), the type of image formation selected as described above and the conditions set as described above are fixed as a pre-registration (step S12). Further, a reservation number specific to the contents of the fixed registration is determined (step S13), and subsequently, the display of the display 113 switches to the guide screen shown in FIG. 10 (step S14).

The guide screen serves to inform a user of a treatment which the user should carry out on the body 1 to execute image formation confirmed (fixed) on the confirmation screen, together with the determined reservation number. This guide screen includes a key "back" and a key "OK".

When the key "back" is clicked on the guide screen (NO in step S15 and YES in step S16), the display of the display 113 returns to the confirmation screen shown in FIG. 9 (step S9).

When the key "OK" is clicked on the guide screen (YES in step S15), registration data comprised of the determined reservation number and the registration contents is generated, and the generated registration data is sent to the body 1 (step S17).

Meanwhile, in the body 1, the touch-panel type liquid crystal display section 14 displays the menu screen shown in FIG. 12 (step S21). The menu screen includes an explanation of a treatment necessary in the case of performing image formation, and prepares a window for inputting a reservation number. Also, the menu screen includes a plurality of keys for selecting copy modes other than the pre-registration mode.

Registration data sent from any of the terminals 111 is received by the body 1 (YES in step S22). The received registration data is stored in the RAM 72 (in step S23).

The user who has made an operation for pre-registration by a terminal 111 stands in front of the body 1 for the user's convenience and inputs a reservation number to the menu screen by touch operation on the touch-panel type liquid crystal display section 14. Further, the user presses the copy key 17.

If a reservation number has already been inputted (YES in step S25) when the copy key 17 is turned on (YES in step S24), registration data corresponding to the inputted reservation number is retrieved from the registration data stored in the RAM 72 (step S26).

If the RAM 72 includes registration data corresponding to the inputted reservation number (YES in step S27), the registration data is read out (step S28). Further, based on the read registration data, image reading, image processing, and image printing are controlled. That is, as is displayed on the confirmation screen of the display 113 at the terminal 111, images equivalent to four sheets of first to fourth pages of the original document are printed on a first paper sheet P, images equivalent to four sheets of fifth to eighth pages of the original document are printed on a second paper sheet P, images equivalent to four sheets of ninth to twelfth pages of the original document are printed on a third paper sheet P, and images equivalent to four sheets of thirteenth to sixteenth pages of the original document are printed on a fourth paper sheet P. These sheets of paper P are stacked on the tray 38.

If registration data corresponding to the inputted reservation number is not included in the RAM 72 (NO in step S27), the display of the touch-panel type liquid crystal display section 14 switches to the re-input guide screen shown in FIG. 13 (step S30). The re-input guide screen includes a sentence explaining that a user is requested to re-input a correct reservation number and also includes a key "cancel".

The user who watched the re-input guide screen finds that the inputted reservation number was wrong, remembers a correct reservation number, and re-inputs it to the re-input guide screen. The user then presses the copy key 17.

If a reservation number has already been inputted (YES in step S32) when the copy key 17 is pressed (YES in step S31), registration data corresponding to the inputted reservation number is searched for from the registration data stored in the RAM 72 (step S26).

If the RAM 72 includes registration data corresponding to the inputted reservation number (YES in step S27), the registration data is read out (step S28). Further, based on the read registration data, image reading, image processing, and image printing are controlled.

However, if the RAM 72 does not hold the registration data corresponding to the re-inputted reservation number (NO in step S27), the touch-panel type liquid crystal display section 14 redisplays the re-input guide screen shown in FIG. 13 (step S30). In this case, if the user gives up copying and clicks the key "cancel" (NO in step S33), the display of the touch-panel type liquid crystal display section 14 returns to the menu screen shown in FIG. 12 (step S21).

Thus, the type and conditions of image formation can be previously registered by each terminal 111. Therefore, even if there are a large number of types of image formation or even if the conditions of image formation are complicated, proper setting can be achieved. That is, since the display 113 of each terminal 111 is much larger in comparison with the touch-panel type liquid crystal display section 14 of the body 1, setting thereof is easy and rapid.

Accordingly, setting errors can be greatly reduced so that wasteful use of sheets of paper P can be prevented. In addition, the body 1 is not exclusively used by one user but all users can easily use the body 1.

Additional advantages and modifications will readily occur to those skilled in the art. Therefore, the invention in its broader aspects is not limited to the specific details and representative embodiments shown and described herein. Accordingly various modifications may be made without departing from the spirit or scope of the general inventive concept as defined by the appended claims and their equivalents.

What is claimed is:

1. An image forming apparatus comprising:
   a read section which reads an image of an original document;
   an image processing section which processes an image read by the read section;
   a print section which prints an image to be processed by the image processing section, onto paper;
   a terminal capable of registering a type and a condition of image formation, provided separately from a body of the apparatus; and
   a controller which controls the read section, the image processing section, and the print section, in accordance with a content of registration made by the terminal;
   when the type and the condition of image formation are registered, the terminal determines a reservation number specific to a content of registration, informs the reservation number to a user, generates registration data constructed by the reservation number and the content of registration, and sends the registration data to the body.

2. The apparatus according to claim 1, wherein the terminal is connected to the body through a network.

3. The apparatus according to claim 1, wherein the controller stores each of registration data sent from the terminal, searches each of the stored registration data for registration data corresponding to an inputted reservation number when the reservation number is inputted to the body, and controls the read section, the image processing section, and the print section, based on the searched registration data.

4. The apparatus according to claim 1, further comprising: a touch-panel type liquid crystal display section capable of inputting and displaying information.

5. The apparatus according to claim 4, wherein the controller stores each of registration data sent from the terminal, searches each of the stored registration data for registration data corresponding to an inputted reservation number when the reservation number is inputted by a touch operation on the touch-panel type liquid crystal display section, and controls the read section, the image processing section, and the print section, based on the searched registration data.

6. The apparatus according to claim 1, wherein the terminal has a controller, a display, and an operation section.

7. The apparatus according to claim 6, wherein the controller of the terminal displays sequentially an initial screen, a select screen, a confirmation screen, and a guide screen for allowing a user to register a type and a condition of image formation, on the display.

8. The apparatus according to claim 7, wherein the initial screen allows a user to specify the presence or absence of registration, when the presence of registration is specified based on display of the initial screen, the select screen allows a user to specify a type of image formation as a target of the registration, the setting screen allows a user to set a condition necessary for the type of image formation selected based on display of the select screen, the confirmation screen allows a user to confirm the type of image formation which is selected based on the display of the select screen, and the condition of image formation which is set based on display of the setting screen, and when image formation confirmed on the confirmation screen is executed, the guide screen informs a user of a treatment which the user should carry out on the body, together with the reservation number.

9. A method of the image forming apparatus which reads an image of an original document, processes the read image, and prints the processed image on paper, the method comprising:

when a type and a condition of image formation are registered by a terminal separate from a body of the apparatus, determining a reservation number specific to a content of registration made by the terminal;

informing the determined reservation number by the terminal;

generating registration data including the determined reservation number and the content of registration, by the terminal;

sending the generated registration data from the terminal to the body of the apparatus;

storing each of the registration data sent to the body, into the body;

when a reservation number is inputted to the body, searching each of the stored registration data for registration data corresponding to the inputted reservation number; and controlling the reading, the processing, and the printing, based on the searched registration data.

10. An image forming apparatus comprising:
read means for reading an image of an original document;
image processing means for processing an image read by the read means;
print means for printing an image to be processed by the image processing means, onto paper;
terminal for previously registering a type and a condition of image formation, provided separately from a body of the apparatus; and
control means for controlling the read means, the image processing means, and the print means, in accordance with a content of registration made by the terminal;
wherein the terminal includes means for, when the type and the condition of image formation are registered, determining a reservation number specific to a content of registration, means for informing the reservation number to a user, means for generating registration data constructed by the reservation number and the content of registration, and means for sending the registration data to the body.

11. The apparatus according to claim 10, wherein the terminal is connected to the body through a network.

12. The apparatus according to claim 10, wherein the control means includes means for storing each of registration data sent from the terminal, means for searching each of the stored registration data for registration data corresponding to an inputted reservation number when the reservation number is inputted to the body, and means for controlling the read means, the image processing means, and the print means, based on the searched registration data.

13. The apparatus according to claim 10, further comprising:
a touch-panel type liquid crystal display means capable of inputting and displaying information.

14. The apparatus according to claim 13, wherein the control means includes means for storing each of registration data sent from the terminal, means for searching each of the stored registration data for registration data corresponding to an inputted reservation number when the reservation number is inputted by a touch operation on the touch-panel type liquid crystal display means, and means for controlling the read means, the image processing means, and the print means, based on the searched registration data.

15. The apparatus according to claim 10, wherein the terminal has a controller, a display, and an operation means.

16. The apparatus according to claim 15, wherein the controller of the terminal displays sequentially an initial screen, a select screen, a confirmation screen, and a guide screen for allowing a user to register a type and a condition of image formation, on the display.

17. The apparatus according to claim 16, wherein the initial screen allows a user to specify presence or absence of registration,
if the presence of registration is specified based on display of the initial screen, the select screen allows a user to specify a type of image formation as a target of the registration, the setting screen allows a user to set a condition necessary for the type of image formation selected based on display of the select screen, the confirmation screen allows a user to confirm the type of image formation which is selected based on the display of the select screen, and the condition of image formation which is set based on display of the setting screen, and when image formation confirmed on the confirmation screen is executed, the guide screen informs a user of a treatment which the user should carry out on the body, together with the reservation number.

* * * * *